Patented May 2, 1944

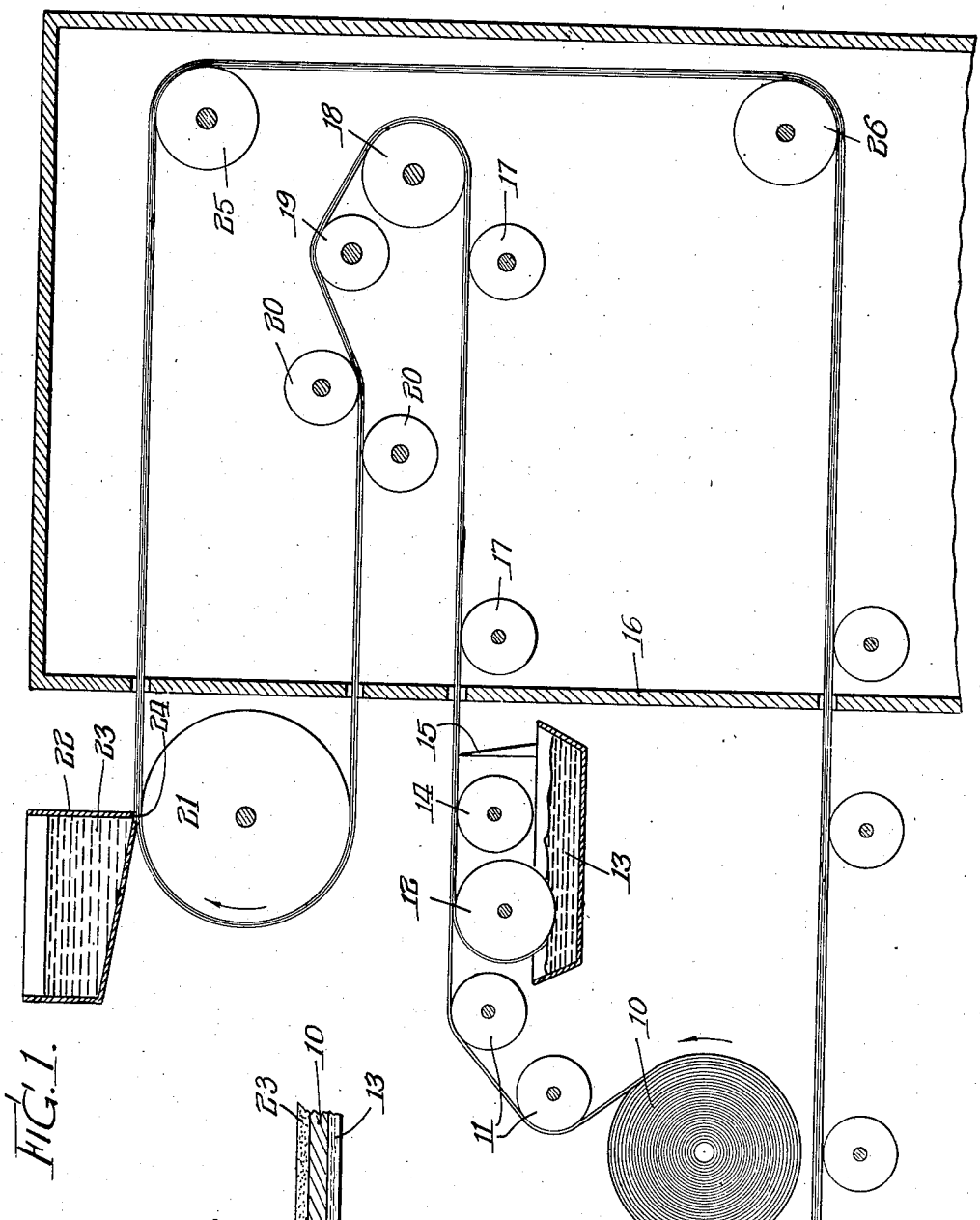

2,347,643

UNITED STATES PATENT OFFICE 2,347,643

CONTINUOUS METHOD FOR PRODUCING ADHESIVE TAPE

Gustave Schieman, Bronx, N. Y., assignor to International Plastic Corporation, Morristown, N. J., a corporation of Illinois Application November 26, 1942, Serial No. 467,000

1 Claim. (Cl. 117—68.5)

It is an object of my invention to provide an apparatus and method relating to the manufacture of adhesive tape or sheets whereby the repellent is applied to one surface and adhesive to the opposite surface of a film or sheet, and the composite structure dried all during one continuous passage through the apparatus.

The product to which my apparatus and method pertain is a film or sheet having a pressure-sensitive adhesive coating on one surface and a repellent coating on the opposite surface, which coating is repellent to the adhesive coating when the composite sheet is later formed into a roll. Heretofore in producing such product, the film is passed from a roll and either the adhesive or repellent coating applied to one surface, and then passed through a drying operation and rerolled. Thereafter, the film is unwound from the roll and again passed through another drying operation, just preceding which drying operation the opposite surface is coated either with repellent or adhesive as the case may be. This is a relatively expensive and time-consuming operation; therefore, it is an object of my invention to apply and dry both adhesive and repellent in one continuous operation.

The above and other objects and advantages will become apparent from a detailed description of the accompanying drawing, in which I have illustrated an apparatus and method embodying one form of my invention. The showing, however, should be understood as being illustrative and not as defining the limits of my invention.

In the drawing:

Fig. 1 is a diagrammatic view of an apparatus illustrating one form of my invention, showing the drying chamber in cross section; and, Fig. 2 is an enlarged cross-sectional view of the finished product produced with my apparatus and method.

Referring to the drawing in detail, 10 indicates a continuous roll of film such as cellulose acetate, paper, or other suitable material mounted on a suitable shaft. The free end of the continuous roll is passed over a pair of rollers 11 mounted above the roller 10, thence horizontally and rearwardly over the large repellent roller 12, which roller 12 travels in a bath 13 of suitable repellent material and applies the repellent coating to one side of the film. Beyond the repellent roller is a smaller roller 14 for engaging, spreading, and smoothing the repellent coating on the film. Forward and adjacent to the roller 14 is a suitable docter blade 15 for engaging the repellent coated surface and removing surplusage repellent. The film with the repellent coating thus supplied passes through a suitable opening into a drying oven 16 over rollers 17, and around the turnover roller 18, thence over the roller 19, and back across the drying oven in the opposite direction between the rollers 20, and out through a suitable discharge opening, and over and around the adhesive turnover roller 21.

Immediately above the roller 21 is mounted an adhesive hopper 22, containing a suitable solution of pressure-sensitive adhesive 23, which adhesive is deposited through the outlet 24 of the hopper on to the side or face of the film opposite to the side on which the repellent has been previously applied.

From this point, the composite tape with repellent on one side and the pressure-sensitive adhesive on the opposite side travels rearwardly through an intake opening into the drying chamber 16 over roller 25, thence downwardly around roller 26 and back across the drying oven and out through a discharge opening in the lower portion of the drying oven to a suitable rewind roller (not shown) where the composite film or tape with the adhesive on one side and the repellent on the other side is rewound into roll form ready for the market.

Thus the blank film, from the time it leaves the supply roller 10, travels continuously without halt or interruption until again reformed by the rewind roller into a roll ready for the market, and that during this continuous travel, a suitable coat of pressure-sensitive adhesive has been applied to one surface and a suitable repellent to the other, and the two coatings properly dried in one continuous operation.

After the repellent has been applied to one side of the film, it first traverses the drying oven for a distance of approximately ten feet, and then its direction is reversed by the reversing roller 18, from where it proceeds in a direction opposite to its initial travel out of the oven. The distance and direction of travel of the film in the drying oven after the repellent coating has been applied is such that the repellent-treated side of the film does not come in contact with rollers or other engaging surfaces until the repellent has been dried, to a condition that the pressure-sensitive adhesive coating can be applied and handled without any complications; that is, at least to a point where the repellent side of the film can be safely engaged by and pulled over the adhesive turnover roller without in any wise injuring, destroying, or affecting the previously applied repellent coating.

The oven is properly heated by any suitable means not shown.

The film, the repellent, and the adhesive utilized may be of the character described in my co-pending application, Serial No. 421,927, filed December 6, 1941, or any other suitable or similar material.

During the initial excursion of the film into and out of the drying oven before the adhesive is applied, the distance, time, and temperature is so correlated as to dry the repellent sufficiently to permit further operations without detrimental results. All the moisture in the film and repellent has not yet been removed, but after the adhesive has been applied and the composite structure again passes through the drying oven, the second excursion is sufficient, when properly correlated as to time and temperature, to remove all solvent and moisture from the coatings and film so that as the composite structure is delivered to the rewind roller, it is free of solvent and moisture.

Having thus described my invention, I claim:

A continuous method for producing a tape having pressure-sensitive adhesive on one side and repellent on the opposite side without subjecting the tape during any stage of its process of manufacturing to any appreciable cooling stages and without reheating any part of the structure during its process of manufacturing which comprises the combination of steps of continuously passing a film after applying a coating of repellent to one side thereof through a drying oven a sufficient time to dry the repellent, then continuously and instantaneously passing the film out of and back into the drying oven and applying pressure-sensitive adhesive to the opposite surface of the film without subjecting the film to any appreciable cooling, then continuously subjecting the composite tape to the temperature of the drying oven as it continuously travels through the drying oven where it is continuously subjected to the temperature of the drying oven to dry and remove all solvent and moisture from the composite film, then passing the composite film free of solvent and moisture direct from the drying oven to a drying roll.

GUSTAVE SCHIEMAN.